J. L. BOICOURT.
PUMPING HEAD.
APPLICATION FILED JULY 11, 1913.
1,117,772.
Patented Nov. 17, 1914.
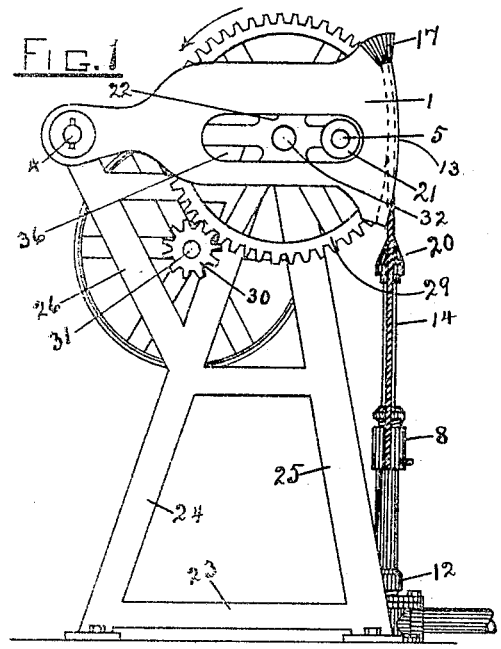
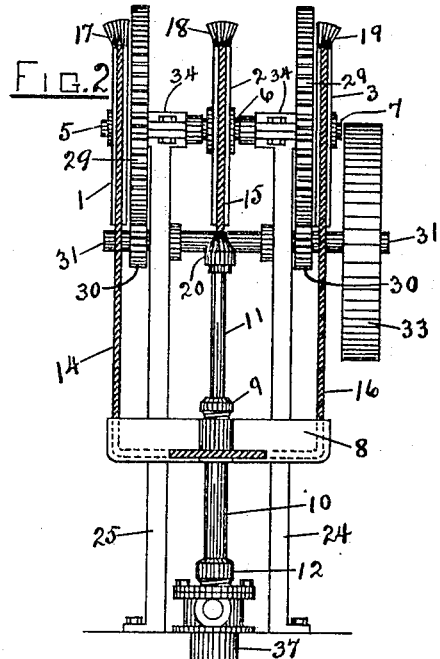
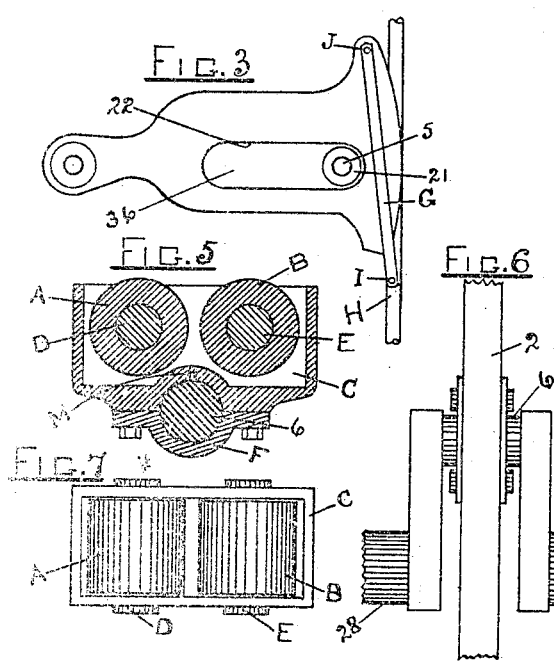
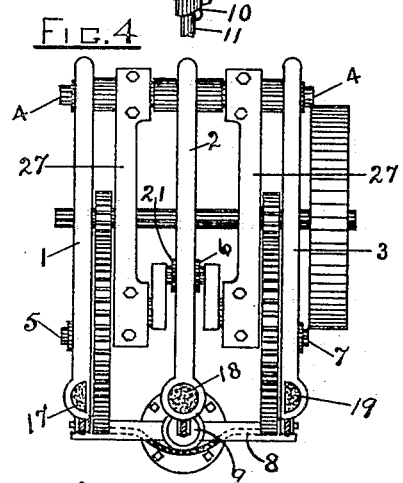
Inventor
John L. Boicourt,
By A. L. Jackson
Attorney
Witnesses

UNITED STATES PATENT OFFICE.

JOHN L. BOICOURT, OF FORT WORTH, TEXAS.

PUMPING-HEAD.

1,117,772.

Specification of Letters Patent.

Patented Nov. 17, 1914.

Application filed July 11, 1913. Serial No. 778,530.

*To all whom it may concern:*

Be it known that I, JOHN L. BOICOURT, a citizen of the United States, residing at Fort Worth, in the county of Tarrant and State of Texas, have invented certain new and useful Improvements in Pumping-Heads, of which the following is a specification.

This invention relates to improvements in pump heads and particularly to a construction which is adapted to drive two piston rods in opposite directions, and the objects of this invention are to eliminate the rigid guides and consequently the friction on the guides, to provide rolling contact guides for the piston rods whereby a vertical pull on the rods is assured without friction, to provide a construction that will give a slow up stroke of piston rods and a quick down stroke of piston rods, to produce a continuous displacement in the pumping cylinder, to provide a construction that will overcome dead centers and prevent back lash on gears, to permit the piston rods to fall by gravity, thus requiring no power to force them down, to provide a greater flexibility on said piston rods and stuffing boxes, causing less wear and less friction on the same, and to provide a construction in which broken parts are easily replaced and will not cause a breakage of the other parts.

Other objects and advantages will be fully explained and the invention will be more particularly pointed out in the claims.

Reference is had to the accompanying drawings which form a part of this application.

Figure 1 is a side elevation of the pump head. Fig. 2 is a front elevation of the same, looking at the right side of Fig. 1. Fig. 3 is a side elevation of a rocker arm, showing a variation for the connection of the pump rods to the rocker arms. Fig. 4 is a plan view of the pump head shown in Figs. 1 and 2. Fig. 5 is a vertical section of roller bearings, being a variation from the bearings shown in the previous views. Fig. 6 is a broken plan view showing application of the rollers shown in Fig. 5. Fig. 7 is a plan view of the rollers shown in Fig. 5.

Similar characters of reference are used to indicate the same parts throughout the several views.

The pump head is provided with a frame which may be cast with the cross bars 23, uprights 24 and 25, bearing arms 26 and bars 27, all integral. A pivot shaft 4 is journaled in the arms 26. A power shaft 31 is journaled in suitable bearings formed in the frame pieces 24. A power pulley 33 is mounted on the shaft 31 for driving the same and pinions 30 are rigid with the shaft 31 and these pinions drive cog wheels 29 which are rigid with the crank shaft 6. The crank shaft 6 is journaled in bearings 34 which are provided at the upper ends of the uprights 24 and 25. Rocker arms 1, 2 and 3 are pivotally mounted on the shaft 4. The rocker arm 2 is operated by the crank shaft 6. The crank shaft 6 has a roller bearing 21 and the rocker arm 2 has a slot 36 therein for movement of roller 21 on the crank shaft 6. The inner piston rod 11 is operated by the rocker arm 2. The rod 11 has a head 20 and a cable 15 is connected to the head 20 and to the upper side of the rocker arm 2. The rocker arm 2 has the free end curved, forming an arc relative to the pivot shaft 4 and the cable 15 lies in a groove in the outer or free end of the rocker arm 2. The cable 15 is attached to the rocker arm 2 by inserting the upper end of the cable 15 in a socket 18 and fastening in the socket by pouring in a cast of lead. Rocker arms 1 and 3 are also pivotally mounted on the pivot shaft 4. These rocker arms are curved at their outer or free ends, similar to the rocker arm 2. The outer piston rod 10 is connected to a cross head 8. The cross head 8 is connected to the rocker arms 1 and 3 by means of a cable which has one arm 14 connected to the rocker arm 1 by means of a leaded socket 17, and the other arm 16 of the cable is connected to the rocker arm 3 by means of a leaded socket 19, similar to the leaded socket 18.

Fig. 2 illustrates how the cable supports the cross head 8 which drives the outer piston rod 10. The arms 1 and 3 are operated by means of crank pins 5 and 7 which are rigid with the cog wheels 29. The crank pins 5 and 7 are provided with roller bearings 21 which run in slots 36 in the rocker arms 1 and 3. The crank pins 5 and 7 must be diametrically opposite the journals of crank shaft 6, or in other words, be 180 degrees from the journal on crank shaft 6. Rocker arms 1 and 3 have slots therein similar to the slot in the rocker arms 1 and 3 and the rollers 21 for the crank pins 5 and 7 under the surfaces 22, which surfaces are the upper walls of the slots in the rocker arms. The crank pins 5 and 7 are in line and operate together and are located directly opposite the crank shaft 6 so that when the crank shaft is rotated rocker arms 1 and 3 are lifted as a unit and allowed to fall by their own weight in the same manner. Rocker arm 2 is lifted while rocker arms 1 and 3 are passing downward. Rocker arms 1 and 3 carry cross head 8 which is attached to the outer or hollow piston rod 10. Rocker arm 2 carries the inside piston rod 11. From this it will be seen that the two piston rods 10 and 11 are caused to operate generally in opposite directions, but since the crank shaft is operated in an anti-clockwise direction, it will be seen that the crank pins 5, and 7 throughout their upward movement describe an arc which lies at a greater distance from the fulcrum 4 than the arc described by these cranks on their downward strokes, and since the crank pins move at a constant rate of speed, the upward movement of the rocker arms 1, 2 and 3 is much slower and also for a longer duration of time than the downward stroke, so that by this movement there is practically no interval of time, when at least one piston rod is not on the upward stroke. The free ends of the rocker arms 1, 2 and 3 are in the form of an arc with the shaft 4 as center. The piston rods 10 and 11 are connected flexibly to the upper ends of the arcs, and roll upon the arc as the rocker arms are oscillated. By this means it will be seen that the piston rod or its connection which comes in contact with the arc by the rocker arms is held at its lowest point of contact 13 with the arc at an exact constant distance from the stationary point 4. The groove in the face of the free ends of the rocker arms retains the cables 14, 15 and 16 in position so that there is a rocking contact of the rocker arms against the cables and the lowest point of contact 13 will always be in a direct vertical position over the piston rods, so that there will be no leaning of the piston rods while in operation, but will move in an unvarying vertical position. This will prevent friction of the piston rods against the pumping cylinder or casing 37. The inner and outer pumping rods are driven in opposite directions by reason of the connections of the inner piston rod to the rocker arm 2 and the connection of the outer piston rod to the rocker arms 1 and 3 and the connection of these rocker arms with the crank-shaft 6 and the connection of the crank shaft to the driving cog wheels 29, and being connected to said gearing on diametrically opposite sides thereof.

A variation is shown in Fig. 3. Instead of the cables which connect piston rods to the rocker arms, link bars G may be pivotally connected to the rocker arm by pivot bolts J; and at the lower ends the links G are pivotally connected to piston rods H by means of pivot bolts I. The rocker arm has the same curved outer edge and the link bars G will swing on each side of the rocker arm so that a rolling contact guide is secured by the piston rod to maintain the piston rod in an unvarying vertical position during operation.

Figs. 5, 6 and 7 illustrate a variation in the roller bearings which operate in the rocker arms. A bearing box C is provided with a bearing for the crank shaft 6. The bearing for the crank shaft 6 may be connected to the bearing box C by a detachable member F which is bolted thereto. Roller bearings A and B are mounted on shafts D and E which are journaled in the bearing box C. These roller bearings will take the place of roller bearings 21. The box C will serve as an oil cup for oiling the rollers A and B and also crank shaft 6 by reason of a small aperture M in the bearing box C. Thus the pair of arms 1 and 3 will be raised vertically by the crank pins 5 and 7 while the rocker arm 2 will descend by reason of the crank shaft 6, and when the crank shaft 6 raises the rocker arm 2 in a vertical direction, the rocker arms 1 and 3 will be moving downward.

The form of the rocker arms 1, 2, and 3 may vary. The parts below the roller bearings 21 of the crank or pins are not necessary to the operation and may be dispensed with. An important feature of the rocker arms is that there must be a curved surface to form the roller contact guide for each piston rod. It is apparent that the same kind of rocker arm can be used for guiding a single piston rod. Any suitable frame may be provided which shall have the necessary bearings for the rocker arms and the gearing. Other changes may be made without departing from my invention. Instead of the crank pins 5 and 7, the crank shaft 6 may be provided with cranks for operating the rocker arms 1 and 3.

What I claim is,—

1. In a pumping head, oppositely driven piston rods and means for driving and guiding said piston rods in their vertical movement consisting of rocker arms pivoted at one end and having the other ends curved forming arcs relative to said pivoted ends and operatively connected to said piston rods and causing unvarying vertical motion of said piston rods and gearing provided with crank pins and a crank shaft for operating said rocker arms.

2. In a pump head, piston rods adapted to be oppositely driven, rocker arms pivoted at one end and having the other ends formed into arcs relative to the pivoted ends and means connecting said piston rods to the upper sides of said curved ends, and said curved ends forming roller contact guides for causing direct vertical pull on said piston rods and gearing provided with a crank shaft and crank pins for operating said rocker arms and causing slower upstrokes of said arms and permitting faster downstrokes of said arms alternately.

3. In a pump head, piston rods adapted to be oppositely driven, rocker arms for driving said piston rods, pivoted at one end and having the free ends extended to the line of travel of said piston rods, means for flexibly attaching said piston rods to the upper parts of said free ends, and means for driving said rocker arms consisting of gearing provided with a crank shaft and crank pins operatively engaging said arms and passing above and below the centers of the gear wheels and alternately causing slower and faster strokes of said arms.

4. In a pump head, piston rods adapted to be oppositely driven, rocker arms pivoted at one end and having the other ends curved and formed into arcs relative to their pivoted ends, said curved ends causing direct vertical motion of said piston rods, means for flexibly attaching said piston rods to the upper sides of said curved rocker arms, and means for driving said rocker arms consisting of a crank shaft for driving the central rocker arm, and gear wheels having crank pins for driving the outer rocker arms.

5. In a pump head, piston rods adapted to be oppositely driven and consisting of an inner piston rod and an outer piston rod, a pair of rocker arms pivotally mounted at one end and having their free ends curved and formed into arcs relative to their pivoted ends, means for flexibly connecting said outer piston rod to said rocker arms, a central rocker arm pivotally mounted at one end and having the other end curved and formed into an arc relative to the pivoted end, means for flexibly connecting the inner piston rod to said central rocker arm, the curved ends of said rocker arms causing direct vertical motion of said piston rods, and means for driving said rocker arms consisting of gear wheels and a crank for said gear wheels operatively connected to the central rocker arm, and crank pins on said gear wheels operatively connected to the outer pair of rocker arms.

6. In a pump head an inner piston rod and an outer piston rod adapted to be oppositely driven, rocker arms consisting of a pair of outer arms and a central arm all pivoted at one end and having their free ends curved and formed into arcs relative to their pivoted ends, means for flexibly connecting the inner pump rod to the central rocker arm, means for flexibly connecting the outer pump rod to the outer rocker arms, the curved ends of the rocker arms causing direct vertical motion of said piston rods, and means for driving said rocker arms consisting of gearing provided with a crank shaft operatively connected to the central rocker arm, and said gearing provided with crank pins operatively connected to the outer rocker arms, said rocker arms having longitudinal slots therein for said crank shaft and for said crank pins, and roller bearings for said crank shaft and crank pins to prevent friction against said rocker arms.

7. In a pump head, piston rods, rocker arms having a common pivotal bearing at one end and having curved surfaces causing direct vertical motion of said piston rods for maintaining direct vertical pull of said piston rods, means for flexibly connecting said piston rods to said rocker arms, and means for driving said rocker arms consisting of gear wheels and a crank shaft therefor, said crank shaft operatively engaging one of said arms, and crank pins rigid with said gear wheels and operatively engaging the other arms, the points of engagement with said arms passing downwardly between the shaft of said wheels and said bearing and passing upwardly on the opposite side of shaft.

In testimony whereof, I set my hand in the presence of two witnesses, this 8th day of July 1913.

JOHN L. BOICOURT.

Witnesses:
A. L. JACKSON,
A. R. CROSSLEY.